US010450114B2

(12) United States Patent
Schulz et al.

(10) Patent No.: US 10,450,114 B2
(45) Date of Patent: Oct. 22, 2019

(54) CONTAINER WITH MOLDED BAG ON VALVE ASSEMBLY

(71) Applicant: Dow Global Technologies LLC, Midland, MI (US)

(72) Inventors: Peter J. Schulz, Midland, MI (US); Marc S. Black, Midland, MI (US); Matthew J. Turpin, Midland, MI (US); Jeffrey E. Bonekamp, Midland, MI (US); Todd A. Hogan, Midland, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 16/032,389

(22) Filed: Jul. 11, 2018

(65) Prior Publication Data

US 2018/0319554 A1    Nov. 8, 2018

Related U.S. Application Data

(62) Division of application No. 15/084,926, filed on Mar. 30, 2016, now Pat. No. 10,046,889.

(51) Int. Cl.
*B65D 47/20* (2006.01)
*B29C 49/20* (2006.01)
(Continued)

(52) U.S. Cl.
CPC .......... *B65D 47/2018* (2013.01); *B29C 45/14* (2013.01); *B29C 45/14065* (2013.01);
(Continued)

(58) Field of Classification Search
CPC ................ B65D 47/2018; B65D 25/14; B65D 83/0061; B65D 83/0055; B65D 83/62;
(Continued)

(56) References Cited

U.S. PATENT DOCUMENTS 3,718,236 A * 2/1973 Reyner et al. ....... B65D 83/625
222/1
3,791,557 A * 2/1974 Venus, Jr. .......... B65D 83/0061
222/105
(Continued)

FOREIGN PATENT DOCUMENTS

WO    2015/059681 A1    4/2015
WO    2016/034823 A1    3/2016

*Primary Examiner* — Lien M Ngo
(74) *Attorney, Agent, or Firm* — Husch Blackwell LLP

(57) ABSTRACT

The present disclosure provides a container and a process for producing the container. In an embodiment, the process includes placing a sleeve bag on valve assembly (SBoV) in a blow mold apparatus. The blow mold apparatus has two opposing and movable molds. The SBoV has a valve seat. The process includes extending a parison of flowable polymeric material around the SBoV and between the opposing molds. The process includes moving the opposing molds to a closed position and pressing an upstream portion of the parison against the valve seat. The process includes blow molding a downstream portion of the parison into a container-shape within the closed mold. The process includes forming a container with the valve seat melt bonded to a neck portion of the container.

16 Claims, 13 Drawing Sheets

(51) Int. Cl.
*B65B 3/02* (2006.01)
*B65D 1/02* (2006.01)
*B65D 25/14* (2006.01)
*B65D 83/00* (2006.01)
*B29C 45/14* (2006.01)
*B29C 49/04* (2006.01)
*B29C 49/06* (2006.01)
*B29L 31/00* (2006.01)
*B65D 83/62* (2006.01)

(52) U.S. Cl.
CPC ........ *B29C 45/14336* (2013.01); *B29C 49/04* (2013.01); *B29C 49/06* (2013.01); *B29C 49/20* (2013.01); *B65B 3/022* (2013.01); *B65D 1/023* (2013.01); *B65D 25/14* (2013.01); *B65D 83/0055* (2013.01); *B65D 83/0061* (2013.01); *B29C 2049/2008* (2013.01); *B29C 2049/2026* (2013.01); *B29C 2049/2047* (2013.01); *B29L 2031/712* (2013.01); *B65D 83/62* (2013.01)

(58) Field of Classification Search
CPC ......... B29C 45/14; B29C 49/20; B29C 49/04; B29C 49/06; B29C 2049/2008; B29C 2049/2026; B29C 2049/2047; B65B 3/022; B29D 45/14065; B29D 45/14336; B29L 2031/712
USPC .................. 222/105, 402.1, 402.16, 402.23
See application file for complete search history.

(56) References Cited

U.S. PATENT DOCUMENTS

| | | | |
|---|---|---|---|
| 3,940,026 A | 2/1976 | Kain | |
| 4,324,350 A | 4/1982 | Thompson | |
| 4,387,833 A | 6/1983 | Venus, Jr. | |
| 4,423,829 A | 1/1984 | Katz | |
| 4,446,991 A * | 5/1984 | Thompson | B65D 83/0055 220/723 |
| 4,892,232 A * | 1/1990 | Martin | B65D 83/54 222/207 |
| 5,111,971 A * | 5/1992 | Winer | B65D 83/0061 222/105 |
| 5,211,316 A | 5/1993 | Adalberto et al. | |
| 5,505,039 A * | 4/1996 | Maier | B65B 31/00 141/20 |
| 7,828,173 B2 * | 11/2010 | Geier | B65D 83/62 141/20 |
| 8,466,335 B2 * | 6/2013 | Klofta | A61M 35/003 424/76.1 |
| 8,752,731 B2 * | 6/2014 | Nimmo | B65B 31/003 141/2 |
| 9,033,185 B2 | 5/2015 | Nimmo et al. | |
| 9,573,750 B2 * | 2/2017 | Seling | B65D 83/48 |
| 2008/0272145 A1 * | 11/2008 | Nimmo | B65D 83/62 222/95 |
| 2010/0133295 A1 * | 6/2010 | Chan | B29C 49/221 222/95 |
| 2010/0255234 A1 | 10/2010 | Koetke | |
| 2011/0259915 A1 * | 10/2011 | Rice | B65D 83/0055 222/95 |
| 2013/0345647 A1 * | 12/2013 | Har-Shai | A62C 13/00 604/257 |

* cited by examiner

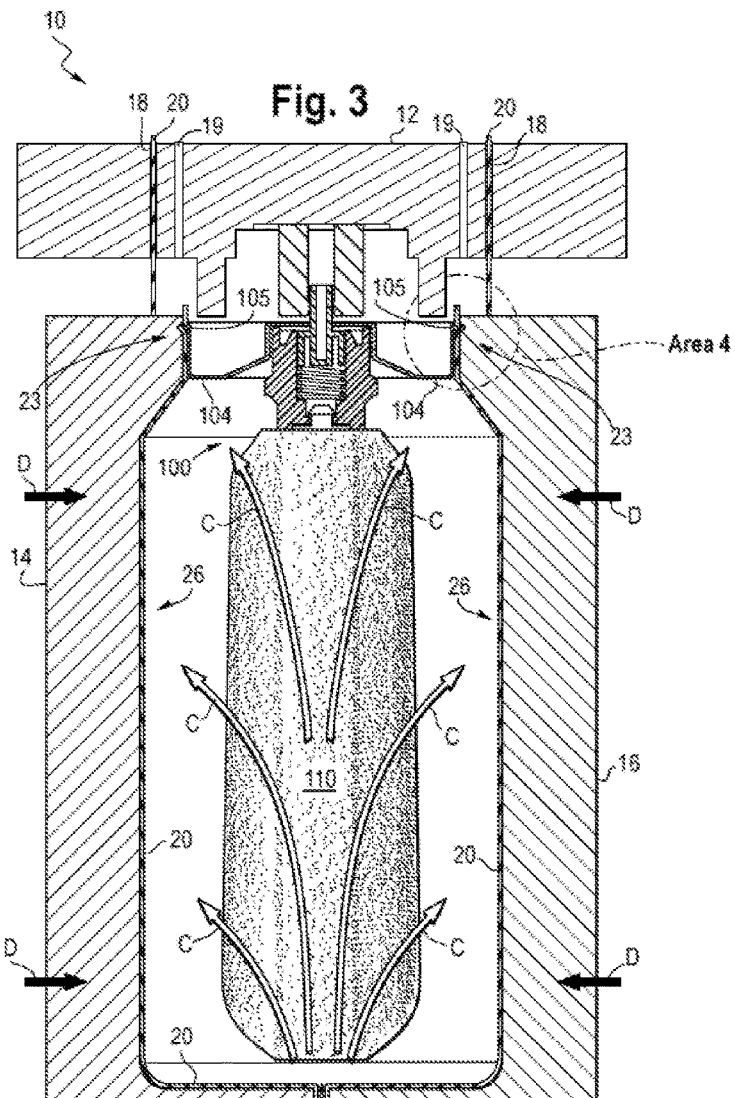

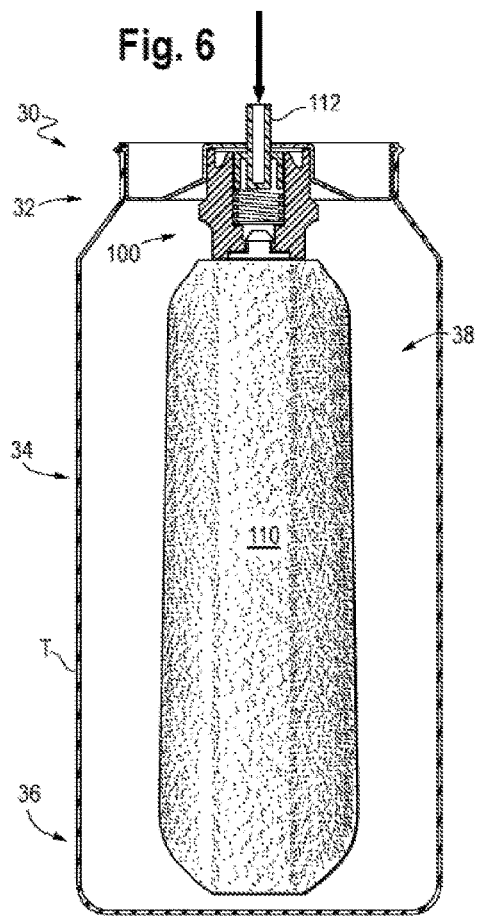
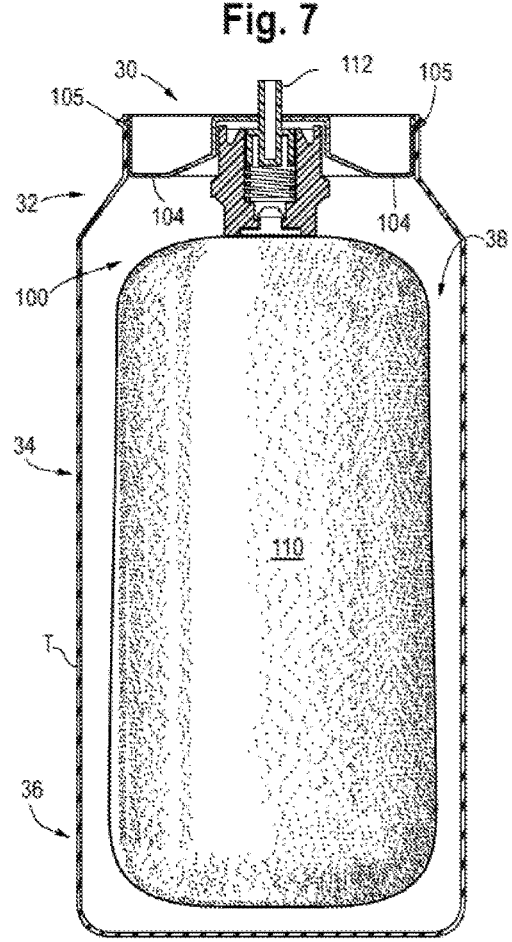

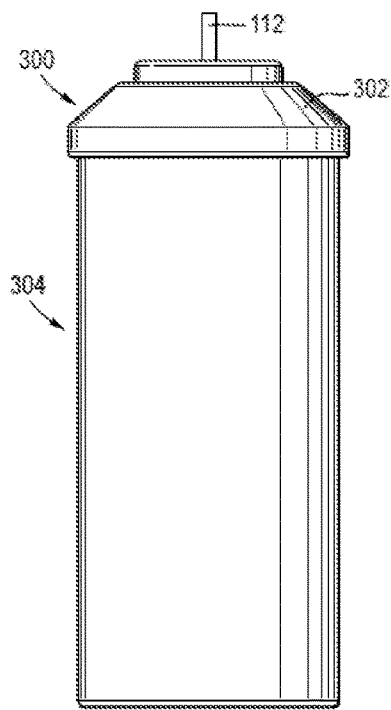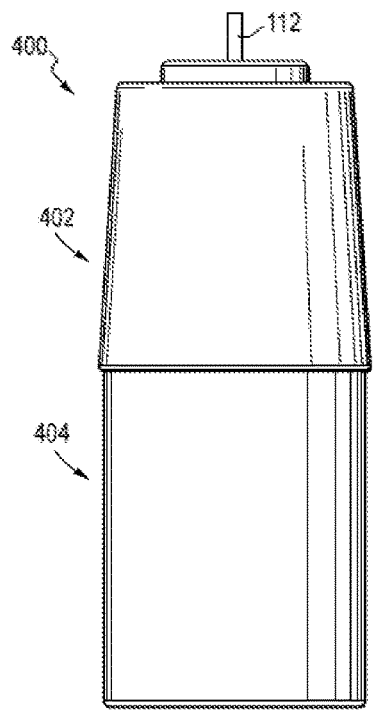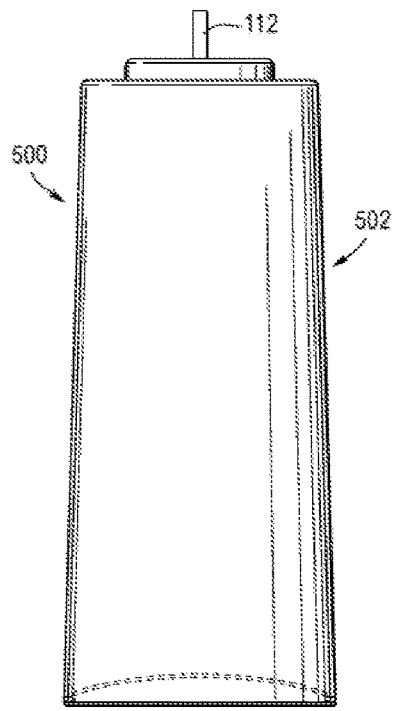

CONTAINER WITH MOLDED BAG ON VALVE ASSEMBLY

BACKGROUND

The present disclosure is directed to a dispenser for pressurized material and a dispenser for propellant-free pressurized material in particular.

Known are sleeve bag-on-valve (SBoV) dispensing systems that utilize an elastic sleeve disposed around a fluid-filled inner bag. Actuation of the valve releases pressure and the elastic sleeve contracts expelling the fluid contents from the bag without a propellant. A drawback of conventional SBoV systems is the need for an outer support container. Conventional SBoV support containers typically top-load the empty SBoV through the neck of a container and subsequently secure the SBoV to the container neck. Conventional support containers are typically metal with the valve seat of the SBoV assembly attached by way of crimping, threaded screws, or welded to the top opening of the container. Once secured to the neck, the sleeve-on-bag portion of the SBoV hangs freely from the neck and into the container interior. The SBoV is then filled under pressure through the valve with fluid composition.

The art recognizes the need for alternate ways to secure the SBoV assembly to the support container, and, in particular, SBoV installment that avoids insertion through the top opening of the support container.

SUMMARY

The present disclosure provides a dispenser for pressurized material and a process for producing a dispenser for pressurized material.

The present disclosure provides a process. In an embodiment, the process includes placing a sleeve bag on valve assembly (SBoV) in a blow mold apparatus. The blow mold apparatus has two opposing and movable molds. The SBoV has a valve seat. The process includes extending a parison of flowable polymeric material around the SBoV and between the opposing molds. The process includes moving the opposing molds to a closed position and pressing an upstream portion of the parison against the valve seat. The process includes blow molding a downstream portion of the parison into a container-shape within the closed mold. The process includes forming a container with the valve seat melt bonded to a neck portion of the container.

The present disclosure provides a container. In an embodiment, a container is provided and includes a neck portion, a body portion, and a bottom portion defining an interior chamber. The container is composed of a polymeric material. The container includes a sleeve bag on valve assembly (SBoV) comprising a valve seat. A portion of the SBoV is located in the container interior. The valve seat is melt bonded to the neck portion.

The present disclosure provides another process. In an embodiment, a process is provided and includes placing a sleeve bag on valve assembly (SBoV) in an injection mold apparatus. The injection mold apparatus has two opposing and movable molds. The SBoV has a valve seat. The process includes moving the opposing molds to a closed position. The two opposing molds define a flowpath in the closed position. A portion of the valve seat is located in the flowpath. The process includes injecting flowable polymeric material into the flowpath, and overmolding a portion of the valve seat with the injected flowable polymeric material. The process includes forming a container part, wherein the valve seat is melt bonded to the container part.

The present disclosure provides another container. In an embodiment, a container is provided and includes a container part composed of a polymeric material, the container part having a proximate end and a distal end. The container includes a sleeve bag on valve assembly (SBoV) comprising a valve seat. The valve seat is melt bonded to the proximate end of the container part. The distal end of the container part has an exposed edge and a closure member at the distal end. The container includes a body portion having a reciprocal closure member at a reciprocal exposed edge. The closure member and the reciprocal closure member are matingly engaged along the exposed edges to attach the container part to the body portion to form a closed container.

An advantage of the present disclosure is a SBoV support container made of a moldable polymeric material that can be formed into a variety of consumer-appealing shapes and configurations for SBoV support.

An advantage of the present disclosure is a container for dispensing a fluid material under pressure and with no propellant. The spray system of the present disclosure can deliver a propellant-free aerosol spray of product, such as a fluid material.

BRIEF DESCRIPTION OF THE DRAWINGS

FIG. 3 is a sectional view of the blow molding apparatus and SBoV, in accordance with an embodiment of the present disclosure.

FIG. 4 is an enlarged view of Area 4 of FIG. 3.

FIG. 6 is a sectional view of a blow-molded container in accordance with an embodiment of the present disclosure.

FIG. 7 is a sectional view a blow-molded container with a filled sleeve bag on valve assembly in accordance with an embodiment of the present disclosure.

FIG. 17 is an elevation view of an injection-molded container with SBoV disposed therein, in accordance with an embodiment of the present disclosure.

FIG. 18 is an elevation view of an injection-molded container with SBoV disposed therein, in accordance with an embodiment of the present disclosure.

FIG. 19 is an elevation view of an injection-molded container with SBoV disposed therein, in accordance with an embodiment of the present disclosure.

DETAILED DESCRIPTION

The present disclosure provides a process. In an embodiment, a process is provided and includes placing a sleeve bag on valve assembly (SBoV) in a blow molding apparatus. The blow molding apparatus has two opposing and movable container mold halves. The SBoV has a valve seat. The process includes affixing the SBoV to the blow molding head. The process includes extending a parison of flowable polymeric material around the SBoV and between the opposing mold halves. The process includes moving the opposing molds toward each other to a closed position. In the closed position, the opposing molds press an upstream portion of the parison against the valve seat. The process includes blow molding a downstream portion of the parison into a container-shape within the closed molds. The process includes forming a container with the valve seat melt bonded to a neck portion of the container.

1. Blow Molding Apparatus

The process includes placing a sleeve bag on valve assembly (SBoV) in a blow molding apparatus. As shown in FIGS. 1-3 and 5, blow molding apparatus 10 includes a die head 12, and opposing container molds 14, 16.

Figure 1:
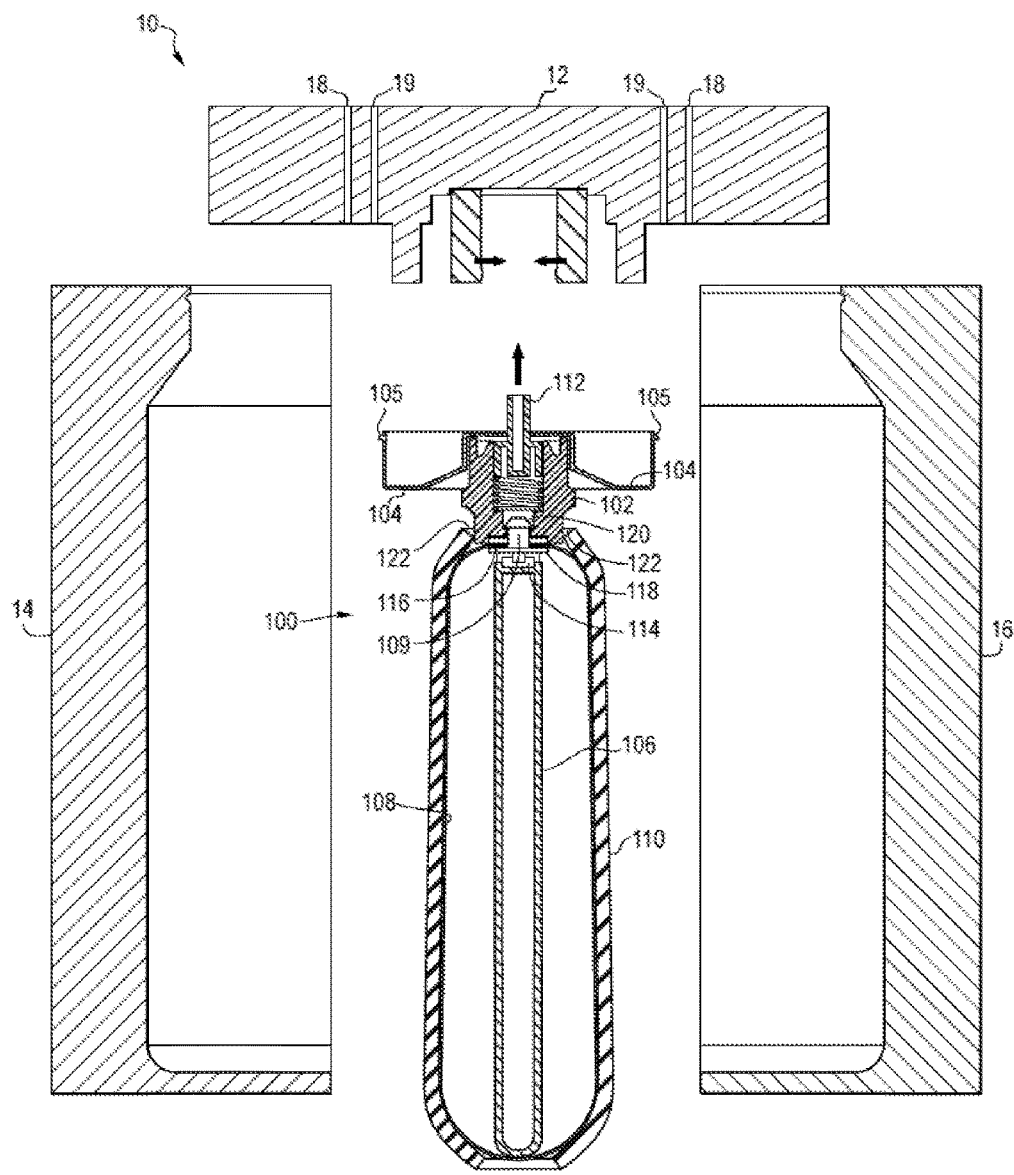
FIG. 1 is a sectional view of a blow molding apparatus and a sleeve bag on valve assembly (SBoV), the SBoV in sectional view, in accordance with an embodiment of the present disclosure.
Figure 2:
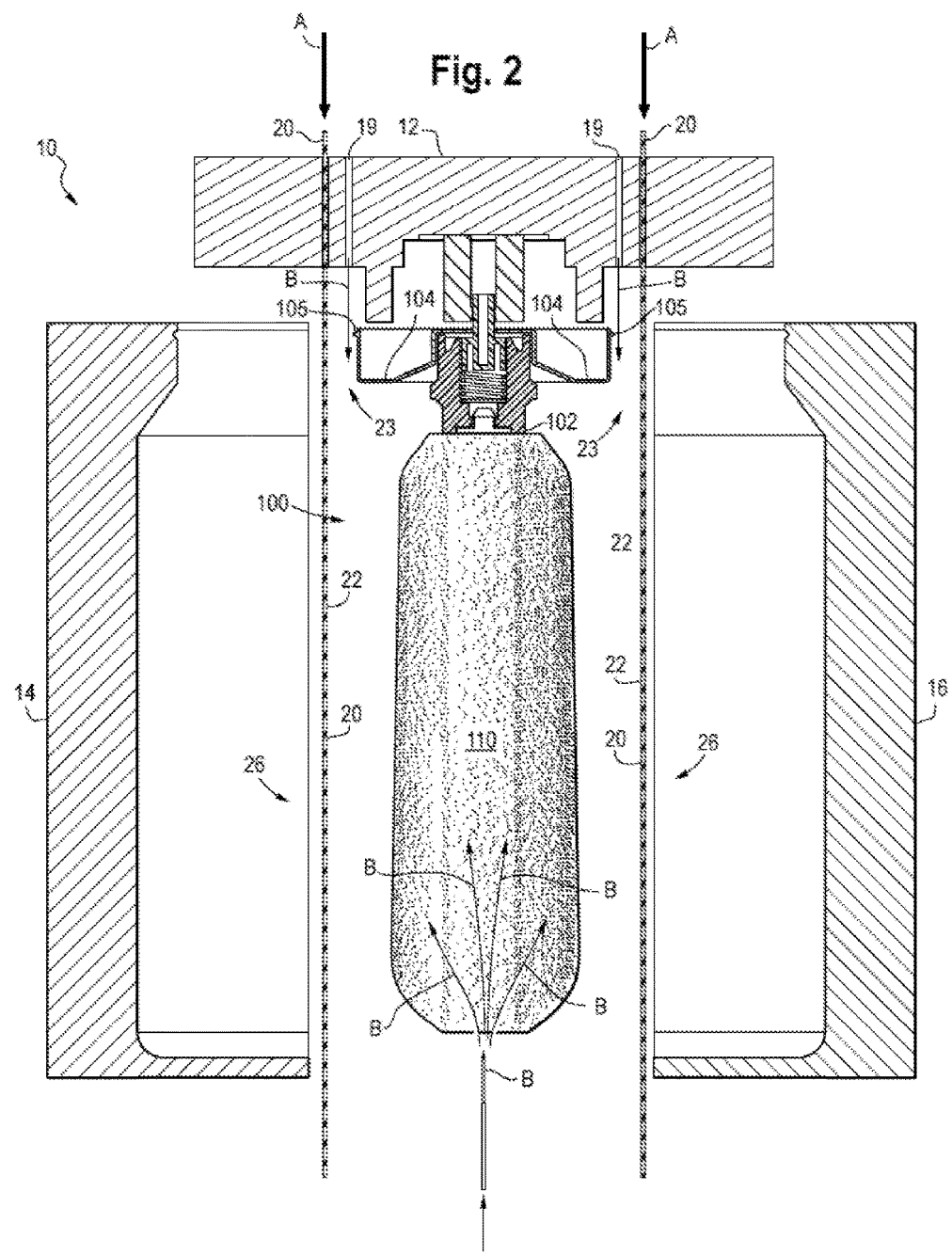
FIG. 2 is a sectional view of the blow molding apparatus and SBoV, in accordance with an embodiment of the present disclosure.
Figure 5:
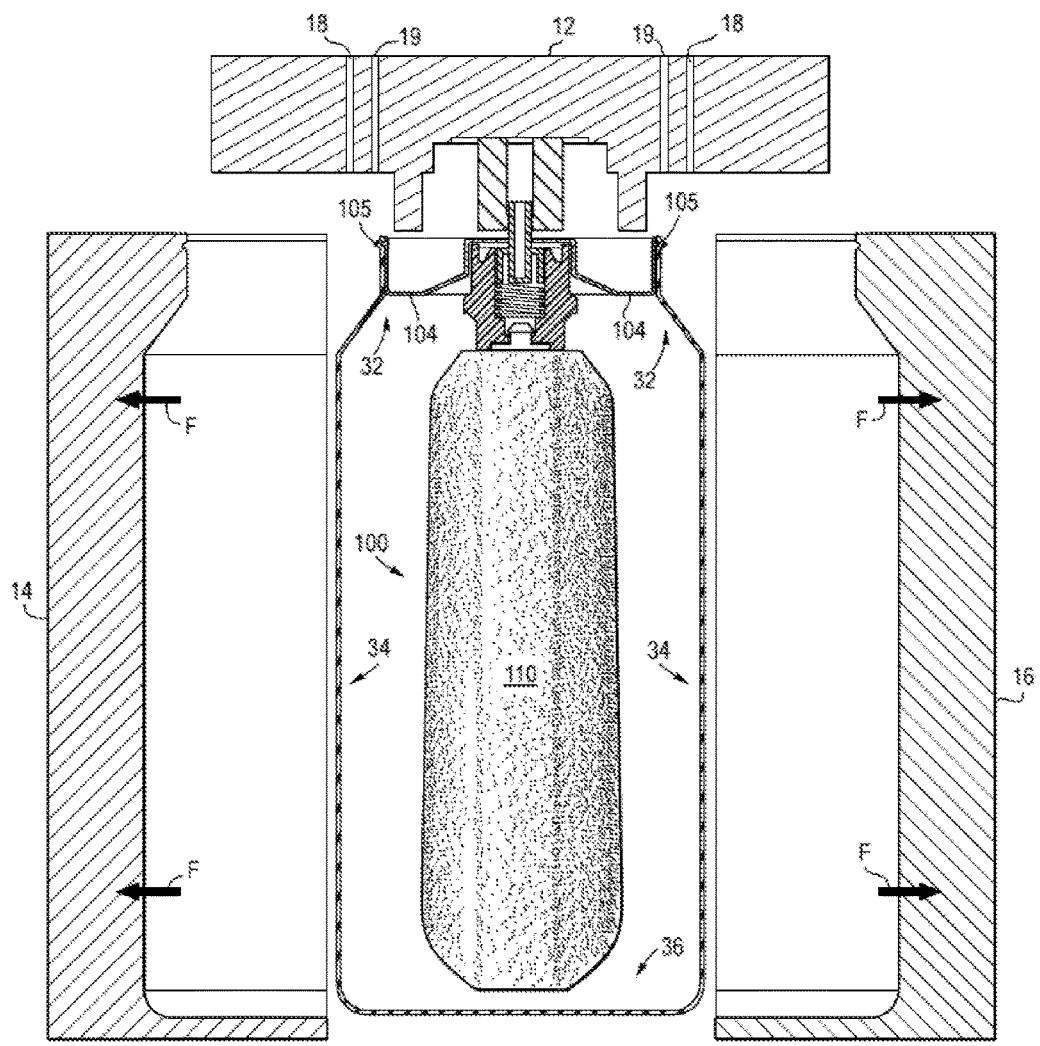
FIG. 5 is an sectional view of the blow molding apparatus and SBoV, in accordance with an embodiment of the present disclosure.

Hereafter, the container molds 14, 16 may be referred to collectively as "container molds," or "molds." Each mold is cast as a container half, the two molds, when moved to a closed position, forming the shape of a closed container having a neck portion, a body portion, and a bottom portion. The blow molding apparatus 10 includes suitable structure and mechanism for moving the two molds 14, 16 toward and away from each other. FIGS. 1 and 2 show the molds 14, 16 away from each other in an open position. Upstream of the die head 12 is an extruder (not shown), or multiple extruders, which are in fluid communication with the die head 12. The extruder provides flowable polymeric material for discharge through the die head 12.

2. Sleeve and Bag on Valve Assembly

A sleeve bag on valve assembly 100 ("SBoV") is releasably attached to the die head 12 as shown in FIGS. 1-3. Nonlimiting attachments for the SBoV to the die head 12 include pneumatic clamps, hydraulic clamps, magnets (electro-magnets), and combinations thereof.

Best shown in FIG. 1, the SBoV 100 includes a valve housing 102, a valve seat 104, a lip portion 105, an optional core tube 106, a bag 108, and a sleeve 110.

The valve housing 102 is configured to hold a valve 112, as shown FIG. 1. FIG. 1 shows a nonlimiting example of a spring valve. The valve housing 102 is securely attached to the valve seat 104. Secure attachment between the valve housing 102 and the valve seat 104 can occur by way of (i) crimping the valve seat 104 onto the valve housing 102, (ii) adhesive attachment between the valve housing 102 and the valve seat 104, and (iii) a combination of (i) and (ii).

The valve seat 104 is composed of a rigid material. Nonlimiting examples of suitable material for the valve seat 104 include metal (steel, aluminum) and polymeric material.

The lip portion 105 is composed of a rigid material. Nonlimiting examples of suitable material for the lip portion 105 include metal (steel, aluminum) and polymeric material.

The SBoV 100 may or may not include the core tube 106. In an embodiment, the SBoV 100 does not have the core tube.

In an embodiment, the SBoV includes core tube 106. As shown in FIG. 1, the core tube 106 is present in the interior of the bag 108, with the bag 108 surrounding the core tube 106. The bag 108 is a flexible film structure composed of a polymeric material. The bag 108 can be a single layer flexible film or a multilayer flexible film. Nonlimiting examples of suitable polymeric material for the bag 108 includes propylene-based polymer, ethylene-based polymer, and combinations thereof. The bag 108 may include a barrier layer such as a metal foil film. The barrier layer may be laminated to the flexible film.

In an embodiment, the outer surface of the bag 108 has a low coefficient of friction (COF) with respect to the sleeve 110 to allow easy filling of the bag 108.

In an embodiment, the bag 108 is a multilayer film having a thickness from 100 micrometers (μm), or 200 μm to 225 μm, or 250 μm and the multilayer film is chemically resistant and a barrier to the fluid composition it contains. In a further embodiment the bag 108 is a multilayer film and includes an oxygen barrier layer, a carbon dioxide barrier layer, a water barrier layer, and combinations thereof.

The core tube 106 can be hollow or can be solid. The core tube 106 can be fluted, pleated or channeled axially to promote movement of product into and through the port 114.

The core tube 106 can be composed of propylene-based polymer or ethylene-based polymer such as HDPE. Alternatively, the core tube 106 can be composed of amorphous polyester such as PETG or other suitable engineering thermoplastic.

In an embodiment, the core tube 106 is composed of a non-collapsing material.

The core tube 106 can have a uniform diameter along its length. Alternatively, the core tube 106 can be tapered. In an embodiment, the core tube 106 is tapered and the diameter of the core tube 106 gradually increases, moving from the proximate end (or top end) of the core tube to the distal end of the core tube. In another embodiment, the distal end of the core tube is rounded to reduce wear and/or prevent puncture of the bag 108.

The core tube 106 can be integral to, or can be a separate component attached to, the valve housing 102. In an embodiment, the core tube 106 is a component separate from the valve housing 102 and the core tube 106 is hollow. A hollow top end 109 of the core tube 106 extends through the opening of the bag 108 as shown in FIG. 1. The core tube 106 includes a port 114 and a port head 118. The port 114 is below the hollow top end 109 and in fluid communication with the hollow top end 109. The open end of the bag 108 is placed between a gasket 116 and the port head 118. The hollow top end 109 attaches to a valve channel 120 on the underside of the valve housing 102 to place the port 114 in fluid communication with the valve 112. The gasket 116 sandwiches the bag opening between the port head 118 and the valve housing 102 to hermetically close, or otherwise securely seal, the bag 108 to the valve housing 102.

In a further embodiment, the secure attachment between the top end 109 and the valve channel 120 is by way of a fixed and secure snap fit. Materials of construction for the top end 109 can be different than for the core tube 106. For example, INFUSE™ ethylene/alpha-olefin multi-block copolymer may be used. Also, in an embodiment, the bag 108 can be heat sealed to the top end 109 to provide hermetic seal and then secured into the valve channel 120.

The sleeve 110 is a tube-like structure made of an elastomeric material. An "elastomeric material," as used herein, is a material that can be stretched with the application of stress to at least twice its length and after release of the stress, returns to its approximate original dimensions and shape showing good recovery. The elastomeric material may, or may not, be a vulcanized or cross-linked or grafted material.

In an embodiment, the elastomeric material is vulcanized.

In an embodiment, the elastomeric material has a linear modulus vs elongation relationship. The elastomeric material exhibits a small amount of creep or stress relaxation sufficient to provide a shelf life from 3 months, or 6 months to 1 year for the fluid composition.

Nonlimiting examples of suitable elastomeric material include ethylene copolymers (like ENGAGE™), ethylene olefin block copolymers (like INFUSE™), ethylene propylene diene monomer terpolymer (EPDM such as NORDEL™ EPDM polymers), ethylene propylene (EPM), nitrile rubber, hydrogenated nitrile butadiene rubber (HNBR), polyacrylic rubber, silicone rubber, fluorosilicone rubber, fluoroelastomers, perfluoro rubber, natural rubber (i.e., natural polyisoprene), synthetic polyisoprene, chloropene, polychloroprene, neoprene, halogenated or non-halogenated butyl rubber (copolymer of isobutylene and isoprene), styrenebutadiene rubber, epichlorohydrin, polyether block amides, chlorosulfonated polyethylene, and any combination of the foregoing. Elastomer additives known in the art to be provide benefit such as antioxidant and processing stabilizers, antiblocks, vulcanization agents (typically sulfur), crosslink agents such as peroxides, accelerators, activators, and optionally dispersants, processing aids, plasticizers, and fillers including organoclays and nanoclays, carbon black, etc. can be included in the elastomer composition.

In an embodiment, the elastomeric material comprises nano-sized organoclays or nanoclays and as such in an elastomeric composite or elastomeric nanocomposite, for example.

The sleeve 110 can expand (and contract), or otherwise elongate, in a radial direction and an axial direction.

In an embodiment, the sleeve 110 expands and contracts in the radial direction.

The sleeve 110 is sized and shaped to contain the bag 108 and to exert pressure on bag 108 when the bag 108 is filled with fluid composition (or fluid product) to be dispensed. The sleeve 110 may or may not have a uniform thickness. The sleeve 110 may or may not impart uniform pressure during the discharge cycle of fluid composition from the bag 108.

In an embodiment, the sleeve 110 provides even pressure during the entire dispensing cycle (bag filled with fluid composition to bag emptied of fluid composition). The sleeve 110 also provides positive pressure on the bag after dispensing ensuring complete discharge of all, or substantially all, fluid composition from the bag 108. The sleeve 110 may or may not be open on top and bottom. The elastic sleeve 110 may be longer than the bag 104 to ensure emptying of all the contents in bag 108.

The sleeve 110 is thick enough to apply a force that is sufficient to expel product from the bag 108 and through the valve 112. When the valve 112 is actuated, the sleeve 110 uniformly contracts to push fluid composition from the bag 108, through the port 114 and out through the valve 112. In an embodiment, the sleeve 110 has a thickness when unexpanded, or otherwise unstretched, and denoted as "sleeve wall thickness." The sleeve wall thickness is from about 1.5 mm, or 2.0 mm, or 3.0 mm, or 5.0 mm, or 7.0 mm to 10.0 mm, or 15.0 mm, or 20.0 mm.

In an embodiment, the sleeve 110 is made of an elastomeric material that has an elongation from greater than 200%, or 250%, or 300% to 400%, or 500%, or 550%, or 600%, or 700%.

In an embodiment, the elastomeric material has a tensile modulus at 200% elongation of at least 2 mega pascals (MPa), or 3 MPa, or 5 Mpa to 8 Mpa, or 10 Mpa, or 12 Mpa, or 14 MPa or higher.

In an embodiment, the sleeve 110 is extended (stretched) to from 300% elongation, or 400% elongation to 500% elongation. In an embodiment, the elastomeric material can have a modulus that is 20 MPa or higher at 400% elongation. The sleeve 110 may also exhibit a relaxation lower than 25% change in tensile modulus at 200% elongation within one year and/or an average creep rate lower than 4 mm/day.

In an embodiment, a clip 122 secures the sleeve 110 to the valve housing 102 as shown in FIG. 1.

In an embodiment, the minimum diameter of the core tube 106 encircled by the empty bag 108 combined (SBoV) is greater than the diameter of the unstretched sleeve 110. With this configuration, the sleeve 110 provides constant positive pressure onto the bag 108 ensuring uniform distribution of the product from the bag until full and complete expulsion of all, or substantially all, product (fluid composition) from the bag 108.

In an embodiment, the core tube 106 and empty bag 108 (the SBoV) have a combined minimum diameter that is from 10%, or 15%, or 20% to 25%, or 30%, or 40%, or even 50% greater than the diameter of the unexpanded sleeve 110. In this way, the sleeve 110 applies constant positive pressure upon the bag 108.

In an embodiment, the sleeve is longer than the bag on core/valve to ensure positive pressure is exerted on the bottom end of the bag sufficient to expel product at the bottom of the bag up and through the port 114 and through the valve 112.

The fluid composition (for dispensing from the bag 108) is a substance that is fluidly deliverable when dispensed under compressive pressure by the sleeve 110, the fluid composition flowing out of the bag 108 under pressure when the valve 112 is opened. The fluid composition can be a liquid, a paste, a foam, a powder, or any combination thereof. Nonlimiting examples of suitable fluid compositions include:

food products, such as mayonnaise, ketchup, mustard, sauces, desserts (whipped cream), spreads, oil, pastry components, grease, butter, margarine, sauces, baby food, salad dressing, condiments, beverages, syrup;

personal care products such as cosmetics, creams, toothpaste, lotions, skin care products, hair gels, personal care gel, liquid soap, liquid shampoo, sun care products, shaving cream, deodorant;

medicaments, pharmaceutical and medical products such as medications (including dosage packages) and ointments, oral and nasal sprays;

household products such as polishes and glass, bathroom and furniture and other cleaners, insecticides, air fresheners; and industrial products such as paints, lacquers, glues, grease and other lubricants, oil sealants, pastes, chemicals, insecticides, herbicides, and fire extinguishing components.

3. Blow Molding

The term "blow molding," as used herein is a manufacturing process by which hollow parts composed of flowable polymeric material are formed. A description of the blow molding process may be found in Blow Molding Handbook, Rosato, Rosato and DiMattia, $2^{nd}$ ed, Hanser, Munich, (2004). The blow molding process begins with heat, or otherwise melting, polymeric material into a flowable state and forming it into an annular structure of flowable polymeric material known as a parison. The annular parison (hereafter "parison") is open at the end proximate to the die head. The parison is initially open at the end opposite of the die head. In one embodiment, compressed gas (such as compressed air) can pass from the die head into the interior of the parison to maintain the opening at the end of the parison opposite the die head. In another embodiment, the compressed gas (such as compressed air) is introduced in the interior volume of the parison at the open end of the parison opposite the die head and maintains the annular shape of the flowable polymeric material. In FIGS. 1-3, the die head 12 includes an annular flowpath 18 through which flowable polymeric material 20 flows. The flowable polymeric material 20 flows downward, or is otherwise drawn downward as shown by downward arrows A in FIG. 2. Those skilled in the art will recognize that the molten polymeric material may exhibit die swell, which may increase both the thickness and the diameter of the parison as the molten polymeric material travels away from the die head. Materials such as high density polyethylene commonly utilized in blow molding applications will exhibit considerable degree of die swell, while materials such as polycarbonate will exhibit a smaller degree of die swell.

4. Polymeric Material

Nonlimiting examples of suitable polymeric material for the parison include olefin-based polymer, nylon (polyamide), polyethylene terephthalate (PET), polyurethane, polycarbonate, polyacrylate, polymethacrylate, cyclic olefin copolymers ("COC", such as TOPAS or APEL), polyesters (crystalline and amorphous), copolyester resin (such as polyethylene terephthalate glycol-modified "PETG"), cellulose esters (such as polylactic acid or "PLA"), polyamide, and combinations thereof.

In an embodiment, the polymeric material is an olefin-based polymer. Nonlimiting examples of suitable olefin-based polymer include propylene-based polymer and ethylene-based polymer. Nonlimiting examples of suitable propylene-based polymer include propylene-based polymer (including plastomer and elastomer), random propylene copolymer, propylene homopolymer, and propylene impact copolymer, blends of propylene-based polymer with other olefin-based polymer such as blends with ethylene-based polymer, polyethylene elastomer, and thermoplastic olefin (TPO).

Nonlimiting examples of suitable ethylene-based polymer include ethylene/$C_3$-$C_{10}$ α-olefin copolymers (linear or branched), ethylene/$C_4$-$C_{10}$ α-olefin copolymers (linear or branched), high density polyethylene ("HDPE"), low density polyethylene ("LDPE"), linear low density polyethylene ("LLDPE"), medium density polyethylene ("MDPE"), and blends of ethylene based polymers.

The polymeric material may include optional additives such as filler, pigment, stabilizer, antioxidant, and combinations thereof.

The polymeric material may be a single layer structure or a multilayer structure. The polymeric material may be biaxially oriented or monoaxially oriented. When the polymeric material is a multilayer structure, the multilayer structure may be coextruded or laminated.

As shown in FIG. 2, the process includes extending a parison 22 of the flowable polymeric material 20 around the SBoV 100 and between the opposing molds 14,16. The parison 22 moves downward from the opening in the die head 12. The downward movement continues such that the parison 22 extends beyond, or otherwise past, the bottom of the SBoV 100. The extension and/or movement of the parison film can be by way of extrusion—(i) a pushing force of additional flowable polymeric material through the annular flowpath 18, (ii) stretching the parison 22 by pulling a lower portion of the parison downward (i.e., stretch blow molding), and (iii) a combination of (i) and (ii).

FIG. 2 is a sectional view showing the parison 22 of flowable polymeric material 20 completely surrounding the SBoV 100. A pressurized gas (such as compressed air), shown by arrows B in FIG. 2 may be optionally introduced into the mold chamber through inlets 19 and/or from below as shown in FIG. 2 in order to maintain the annular shape and structure of the flowable polymeric film.

Once the parison 22 of the flowable polymeric material 20 has been extended around the SBoV 100, between the opposing molds 14, 16 and beyond, or otherwise past, the bottom of the SBoV 100, the flow of the polymeric material is paused, halted, or otherwise interrupted such that flowable polymeric material 20 is no longer flowing from the die head 12.

It is understood the present process is intermittent blow molding or reciprocating blow molding rather than continuous blow molding. In one embodiment, the flow of polymeric material is halted by stopping the screw rotation in the extruder. Alternatively, the flow of polymeric material is halted by allowing the extruder screw to reciprocate while continuing to rotate, known as reciprocating blow molding. In another embodiment, the flow of polymeric material may be halted by allowing the screw to continue to rotate while simultaneously filling a cylinder or accumulator positioned between the extruder and the die head, known as accumulator blow molding.

The process includes moving the opposing molds 14, 16 toward each other to press an upstream portion 23 of the parison 22 against the valve seat 104. In an embodiment, the opposing molds 14, 16 move to a closed position, as shown by arrows D in FIG. 3, to impart pressure (and optional heat) onto the upstream portion 23 of the parison 22 adjacent to the valve seat 104. FIG. 3 shows the molds 14, 16 in the closed position. Parison 22 is in the melt state (or is in a flowable state) and is malleable. The force of the closed molds 14, 16 push the upstream portion 23 into intimate contact with the valve seat 104, shaping and forming the malleable flowable polymeric material 20 onto and around the valve seat 104.

In an embodiment, the closed and opposing molds 14, 16 press the parison 22 of flowable polymeric material 20 (*i*) against, (ii) around, and (iii) against and around the lip portion 105 as shown in FIG. 3. In this way, the radial inward force imparted by the molds 14, 16 onto the lip portion 105 overmold the flowable polymeric material 20 onto and around the lip portion 105. FIG. 4 shows flowable polymeric material 20 pressed and shaped around the lip portion 105. Upon solidification of the flowable polymeric material 20, the lip portion 105 is immobilized in the solid polymeric material, forming a melt bond 24 between the polymeric material and the lip portion 105 and/or the valve seat 104.

The term "melt bonded," as used herein, refers to a polymeric material that is overmolded, in the melt state, onto (and/or around) a structure, and the resultant adhesion between the structure and solid state polymeric material. As shown in FIG. 4, the flowable polymeric material 20 solidifies and adheres to the lip portion 105. In an embodiment, the pressing and blow molding procedure surrounds the lip portion 105, immobilizing the lip portion 105 in solid polymeric material 20 for firm and rigid adhesion.

In an embodiment, the upstream portion of the parison 22 has a thickness that is greater than the thickness of the downstream portion. Additional polymeric material in the upstream portion ensures sufficient polymeric material is available to secure valve seat 104 and/or lip portion 105 firmly in place and/or provide greater rigidity and strength to the container near the valve. Parison thickness can be controlled by controlling die gap flow.

The process includes moving the opposing molds 14, 16 toward each other to a closed position to press the downstream portions 20 of the parison against each other. At point E (FIG. 3), the closed molds 14, 16 seal together opposing sides of the parison 22, closing the bottom portion to create a closed tube inside the mold halves.

In an embodiment, the process includes blow molding a downstream portion of the parison into a container-shape within the closed molds 14, 16. A needle is utilized to pierce the closed parison and a pressurized gas (such as compressed air), shown by arrows C in FIG. 3, is introduced into the mold chamber as shown in FIGS. 2-3. A downstream portion 26 of the parison 22 is blow molded against the inner surfaces of the molds 14, 16. The parison 22 is malleable and shapeable because the polymeric material 20 is flowable. The pressurized gas forces, or otherwise moves, the parison 22 radially outward to impinge against the interior surfaces of each mold 14, 16. The parison 22 takes the shape that is cast upon the interior surfaces of molds 12, 14. The mold surface temperature may be controlled by circulating a fluid, such as air, water, glycol or mixtures of water and glycol through cooling channels installed in the molds. The gas inflation pressure is maintained such that the polymer in contact with the mold surface is provided sufficient time to cool to such temperature that the polymer becomes sufficiently rigid to maintain the shape of the formed article. Once the polymer has sufficiently cooled, the gas inflation pressure is removed and the needle retracted from the bottle. The mold is opened, valve 112 is released from the die head and the container with SBoV is removed.

In an embodiment, the pressing procedure (of the upstream portion 23) and the blow molding procedure (of the downstream portion 26) are performed simultaneously, or substantially simultaneously (i.e., within 0.1 seconds, or 0.5 seconds, or 1.0 second, or 1.5 seconds, or 2.0 seconds) with respect to each other.

The process includes forming a container 30 with the valve seat 104 of the SBoV 100 melt bonded to a neck portion 32 of the container. The opposing molds 12, 14 move from the closed position to the open position as shown by arrows F in FIG. 5. The formed blow molded container 30 is removed from the blow mold apparatus 10. The excess polymeric material 28 is removed from the formed container 30 in a subsequent operation.

5. Blow Molded Container

The process produces container 30 as shown in FIGS. 5-8. In an embodiment, a container 30 includes a neck portion 32, a body portion 34, and a bottom portion 36. The container 30 is closed and defines an interior chamber 38. The container 30 is composed of a polymeric material. The container includes the SBoV 100 extending into the interior chamber. The valve seat 104 and/or the lip portion 105, is melt-bonded to the neck of the container.

The blow molding process forms a single-piece container 30. The neck portion 32, the body portion 34, and the bottom portion 36 form a single unitary and integral component. The container 30 that is an integral component is composed of the previously flowable polymer material that was the parison and is cooled and solidified to a non-flowable solid state polymeric material in the container 30.

In an embodiment, a lip portion 105 of the valve seat 104 is melt bonded to the neck portion 32. The polymeric material of the neck portion 32 immobilizes the valve seat 104 and/or the lip portion 105 and permanently seals, or otherwise permanently bonds, the SBoV 100 to the container 30.

The bag on valve portion of the SBoV extends freely into the interior chamber 38 as shown in FIGS. 6-7.

FIGS. 6 and 7 demonstrate how the bag 108 of the SBoV 100 is filled with fluid composition through the valve 112. Fluid composition is introduced with positive pressure through the valve 112 and into the bag 108. FIG. 7 shows sleeve 110 stretched with the bag 108 holding a fluid composition and sleeve 110 applying the pressure.

The present container 30 maintains its shape, not collapsing or changing dimensions or appearance as the fluid composition is expelled from the bag (creating internal vacuum). In an embodiment, the average wall thickness, T, for the container 30 is from 0.075 mm, or 0.1 mm, or 0.15 mm, or 0.2 mm to 1.0 mm, or 1.5 mm, or 2 mm, or 3 mm.

Figure 8:
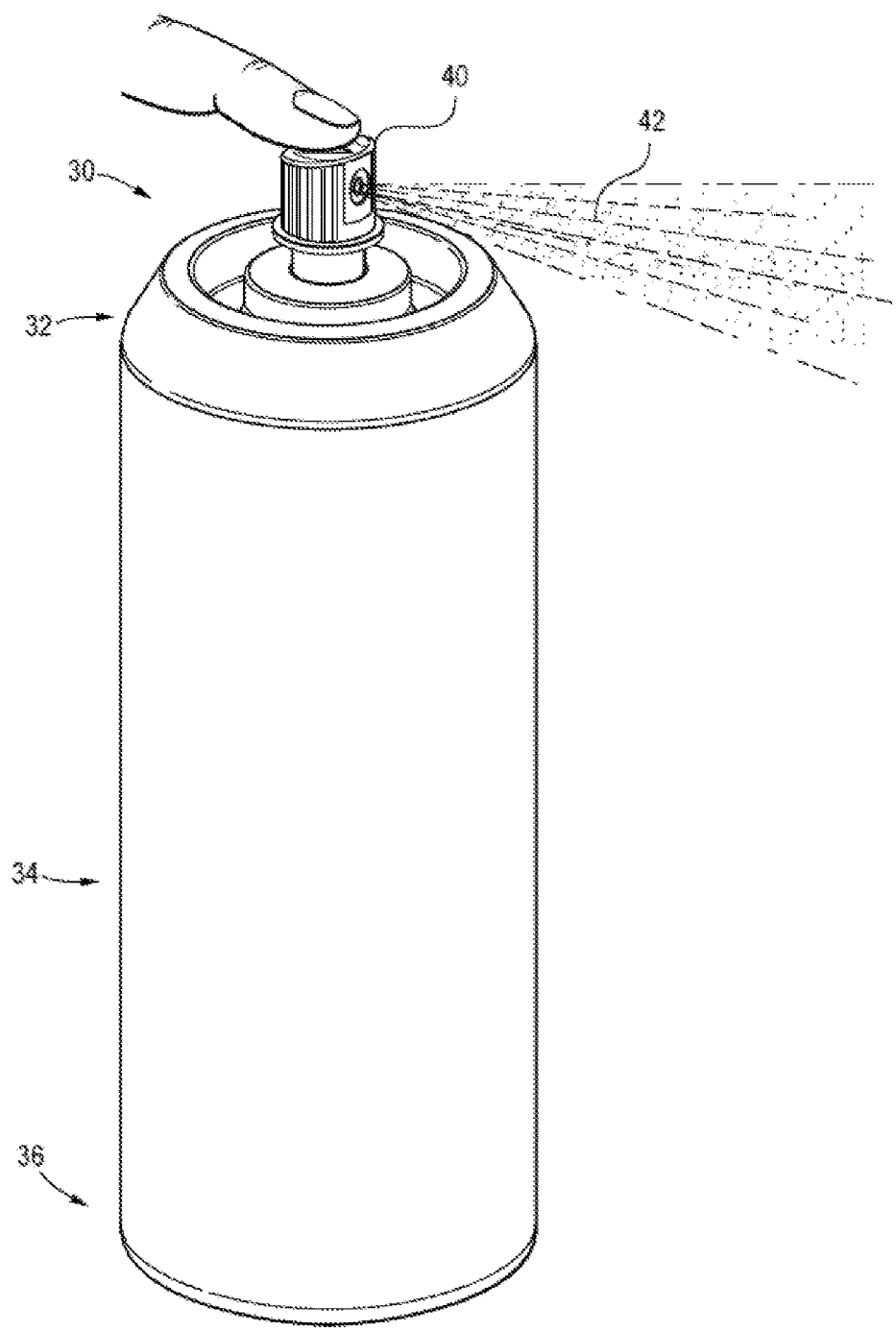
FIG. 8 is a perspective view of the blow molded container with the SBoV disposed therein, the container dispensing a fluid composition.

In an embodiment, a valve cap 40 is attached to the valve 112 as shown in FIG. 8. Valve cap 40 enables a user of the container 30 to direct the spray (as well as determine the spray pattern and/or determine the spray flow rate) of the fluid composition 42 in a desired direction.

In an embodiment, the interior chamber 38 (shown in FIG. 7) has a volume from 0.050 L, or 0.1 L, or 0.2 L, or 0.3 L, or 0.4 L, or 0.5 L, or 0.6 L, or 0.75 L, or 1.0 L, or 1.5 L, or 2.5 L, or 3.0 L, or 3.5 L, or 4.0 L, or 5.0 L, or 10.0 L to 20.0 L, or 25 L, or 28.5 L. In a further embodiment, the volume of the filled bag 108 is from 5%, or 10%, or 15% to 20%, or 25%, or 30% less than the volume of the container 30.

FIG. 8 shows bottom portion 36 supporting the container 30 during discharge of a fluid composition 42. The container 30 provides sufficient strength and rigidity to maintain, or otherwise hold, SBoV 100 and container 30, in a vertical position, or in a substantially vertical position. Therefore, in an embodiment, the container 30 is "a stand-up container."

After complete, or substantially complete discharge of the fluid composition, the bag 108 can be re-filled with fluid composition through the valve 112. In an embodiment, the SBoV 100 of dispenser 30 can be refilled one time, or two times, or three times, to four times, or five times or more.

The valve 112 can also have various types of actuators or spray caps fastened to it in order to deliver product in the desired manner including but not limited to fluid stream, gel, lotion, cream, foam, fluid spray, or mist.

6. Injection Mold Apparatus

The present disclosure provides another process. In an embodiment, a process includes placing a sleeve bag on valve assembly (SBoV) in an injection mold apparatus. The injection mold apparatus has two opposing and movable molds. The SBoV has a valve seat. The process includes moving the opposing molds toward each other to a closed position. In the closed position, the two opposing molds define a flowpath. A portion of the valve seat is located in the flowpath. The process includes injecting flowable polymeric material into the flowpath and overmolding a portion of the valve seat with the injected flowable polymeric material. The process includes forming a container part, wherein the valve seat is melt bonded to the container part.

The term "injection molding," and like terms, refers to a process for producing parts by injecting material into a mold. Polymeric material is fed into a heated extruder, the polymeric material heated to a flowable state, and forced into a mold cavity. The flowable polymeric material cools and hardens to a solid and to the configuration of the cavity.

Figure 9:
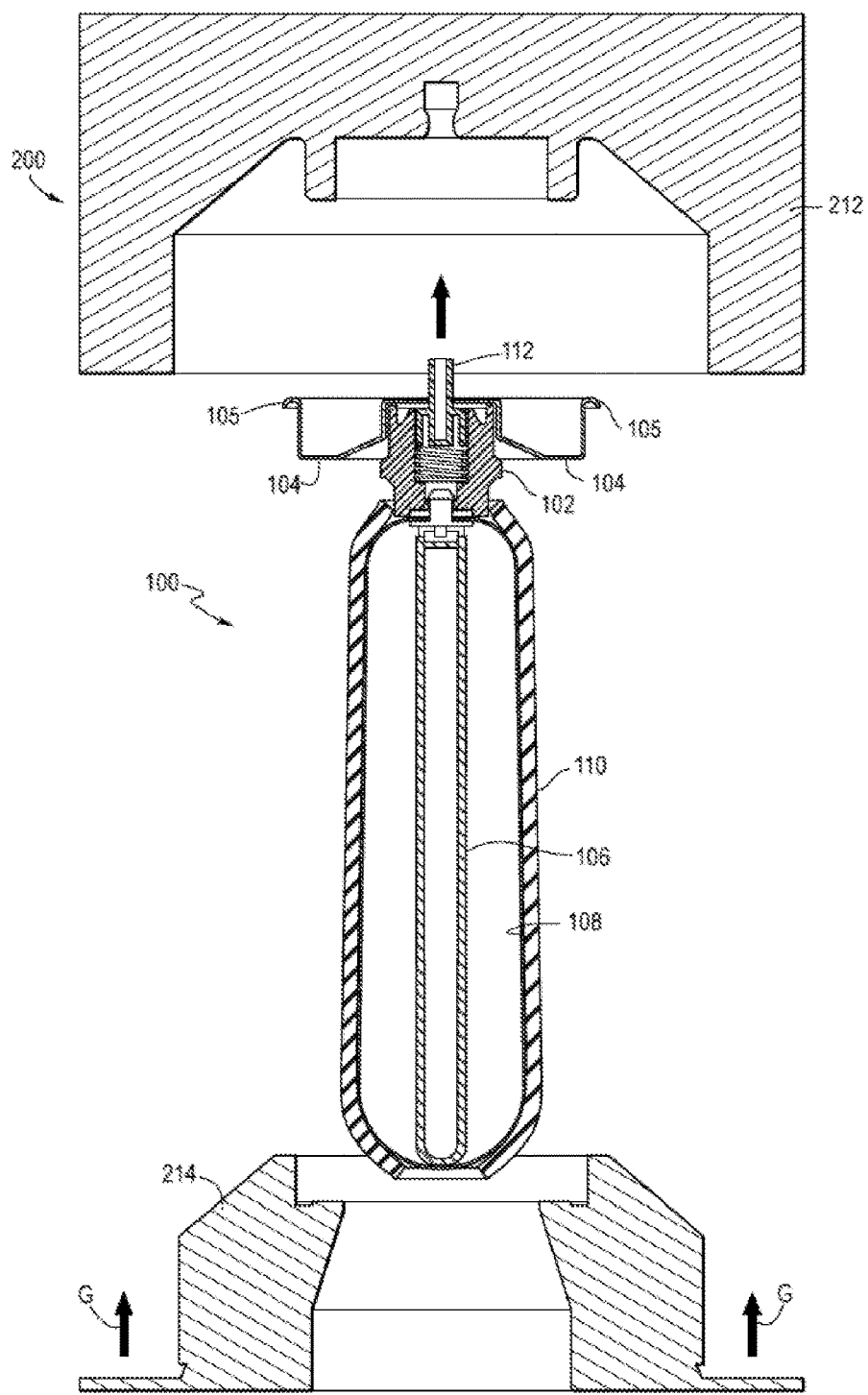
FIG. 9 is a sectional view of an injection molding apparatus and SBoV, the SBoV in sectional view, in accordance with an embodiment of the present disclosure.
Figure 10:
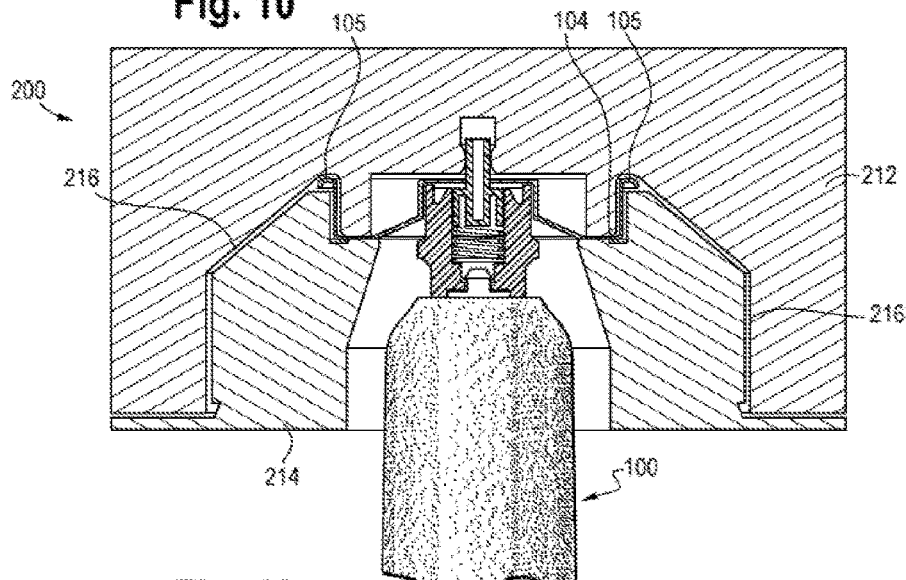
FIG. 10 is a sectional view of the injection molding apparatus and SBoV in accordance with an embodiment of the present disclosure.
Figure 11:
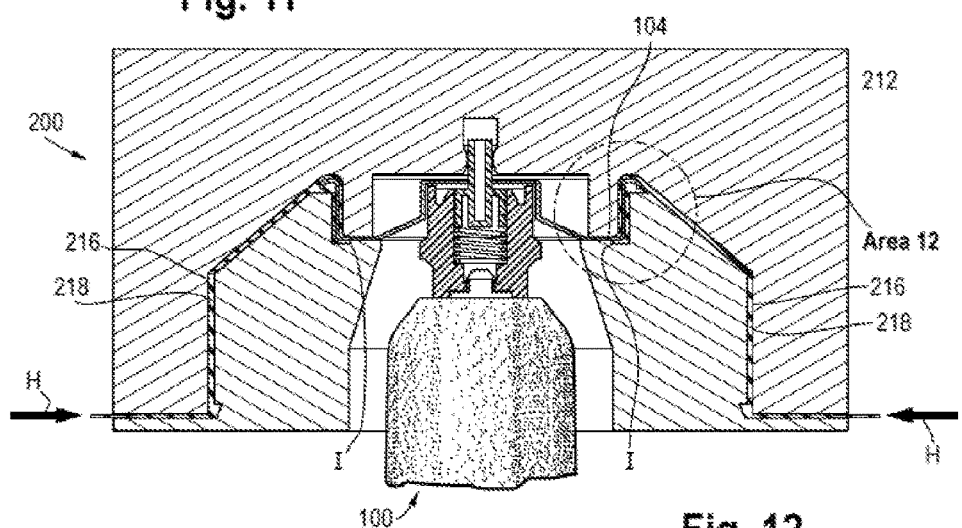
FIG. 11 is a sectional view of the injection molding apparatus and SBoV in accordance with an embodiment of the present disclosure

In FIGS. 9-11, SBoV 100 is placed in an injection mold apparatus 200. The injection mold apparatus 200 includes two opposing molds 212 and 214. Molds 212 and 214 are movable with respect to one another. Alternatively, mold 212 is stationary with mold 214 movable with respect to mold 212 or vice versa. The cavity of mold 212 is configured to receive the valve seat 104 of the SBoV 100.

The process includes moving the two opposing molds toward each other to a closed position. Arrows G in FIG. 9 show mold 214 moving toward mold 212. Mold 214 is moved to a closed position as shown in FIG. 10. In the closed position, the two opposing molds 212, 214 define a flowpath 216. In the closed position, the housing 102, bag 108, and sleeve 110 are not in contact with the mold.

A portion of the valve seat 104 is located in the flowpath 216 as shown in FIG. 10. FIG. 11 shows injection of flowable polymeric material 218 into the flowpath 216. The flowable polymeric material may be any polymeric material as previously disclosed herein. In an embodiment, the polymeric material is HDPE.

The process includes injecting flowable polymeric material into the flowpath. For example, flowable polymeric material 218 may be injected under pressure at entry point H. Under positive injection pressure, the flowable polymeric material 218 travels through and fills the flowpath 216. The moving flowable polymeric material 218 contacts the valve seat 104 and continues flowing to endpoint I. At endpoint I, the flowpath 216 ends, with the opposing molds 212, 214 in direct contact with the valve seat 104. At endpoint I, the opposing molds 212, 214 sandwich the valve seat 104 ending the flowpath 216. Endpoint I prevents further inward flow of the flowable polymeric material 218, preventing flow of the flowable polymeric material toward the housing 102.

Figure 12:
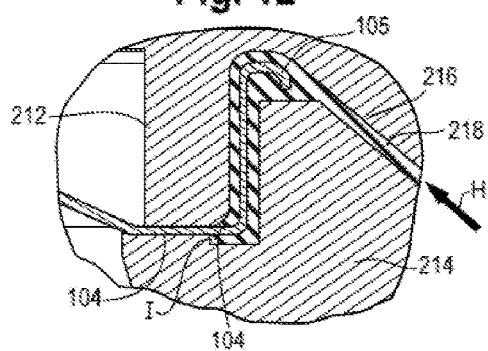
FIG. 12 is an enlarged view of Area 12 of FIG. 11.

The process includes overmolding a portion of the valve seat with the injected flowable polymeric material. The flowable polymeric material 218 comes in direct and intimate contact with the lip portion 105 and optionally the valve seat 104. In an embodiment, the injected flowable polymeric material 218 comes into direct and intimate contact with the lip portion 105 and the a portion of the valve seat 104. As best seen in FIGS. 11 and 12, the flowable polymeric material 218 flows around both sides of the lip portion 105 and around both sides of the valve seat 104. The flowable polymeric material surrounds the lip portion 105 and surrounds a portion of the valve seat 104, the flowable polymeric material 218 melt bonding to the value seat 104 and lip portion 105 as it cools and solidifies.

Figure 13:
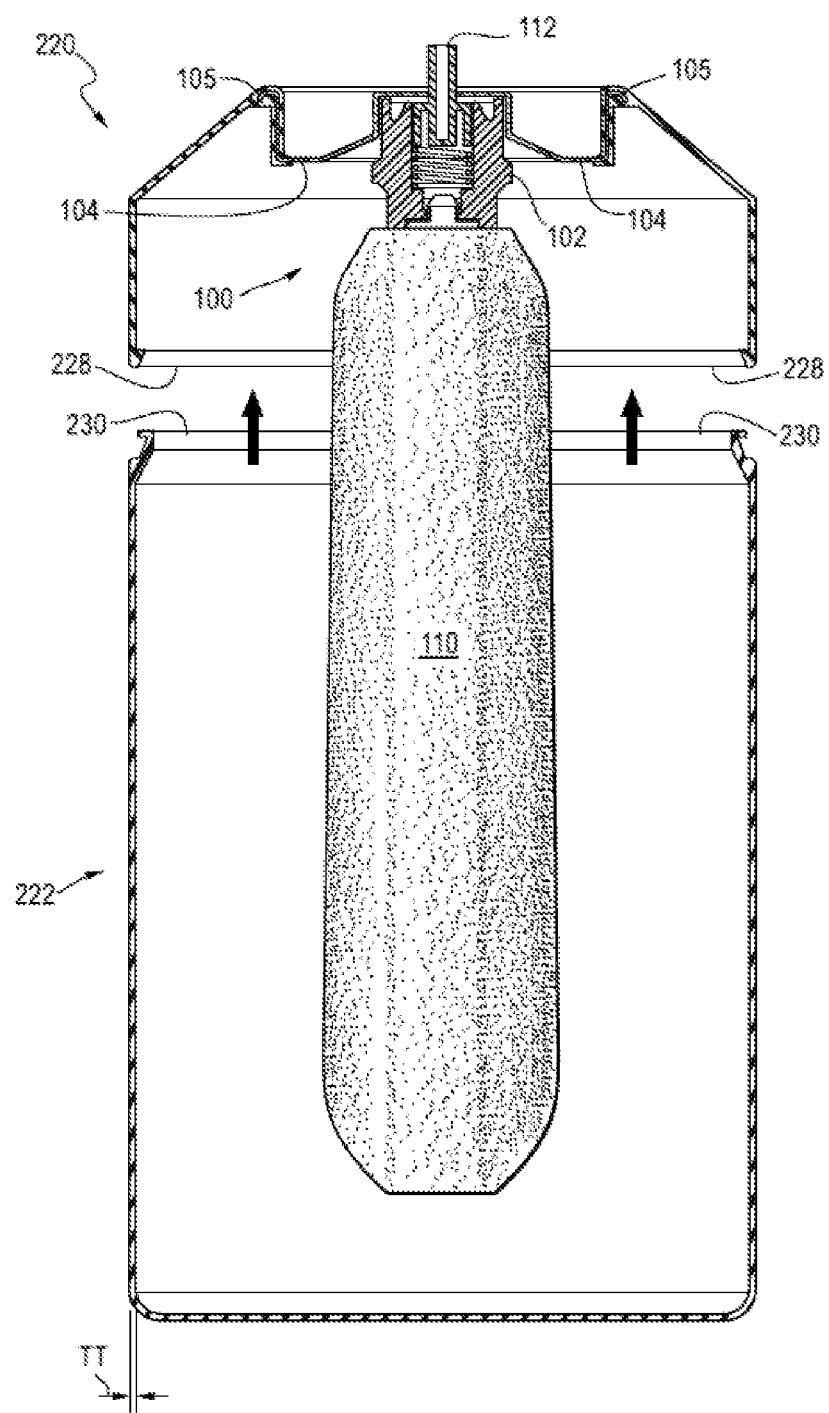
FIG. 13 is a sectional view of the joining of container parts in accordance with an embodiment of the present disclosure.

The process includes forming a container part, wherein the valve seat is melt bonded to the container part. The flowable polymeric material 218 is allowed to cool and solidify. Upon cooling, the polymeric material 218 adheres to the valve seat 104 and adheres to the lip portion 105. In the solid state, the polymeric material 218 solidifies, or otherwise hardens, and melt bonds to the lip portion 105 and melt bonds to a portion of the valve seat 104. In FIG. 13, the valve seat 104 and the lip portion 105 are melt bonded to the solid polymeric material, the valve seat 104 and the lip portion 105 immobilized in the solidified polymeric material that was previously the flowable polymeric material 218 that is formed into a container part 220.

In an embodiment, the container part 220 is attached to a container body 222 shown in FIGS. 13-16 to form a closed container 224. Container 224 defines an interior chamber 226 in which the bag 108 and sleeve 110 are located. Exposed edge 228 of container part 220 has a closure member that matingly engages with a reciprocal closure member on a reciprocal exposed edge 230 of the container body 222. Nonlimiting examples of suitable closure member/reciprocal closure member include snap fit closure, tongue and groove closure, male-female closure, friction fit, face seal, and combinations thereof. In addition, the closure member can be secured to the reciprocal closure by way of adhesive, stir weld, spin weld, hot plate (melting and fusing together, and ultrasonic welding.

Figure 14:
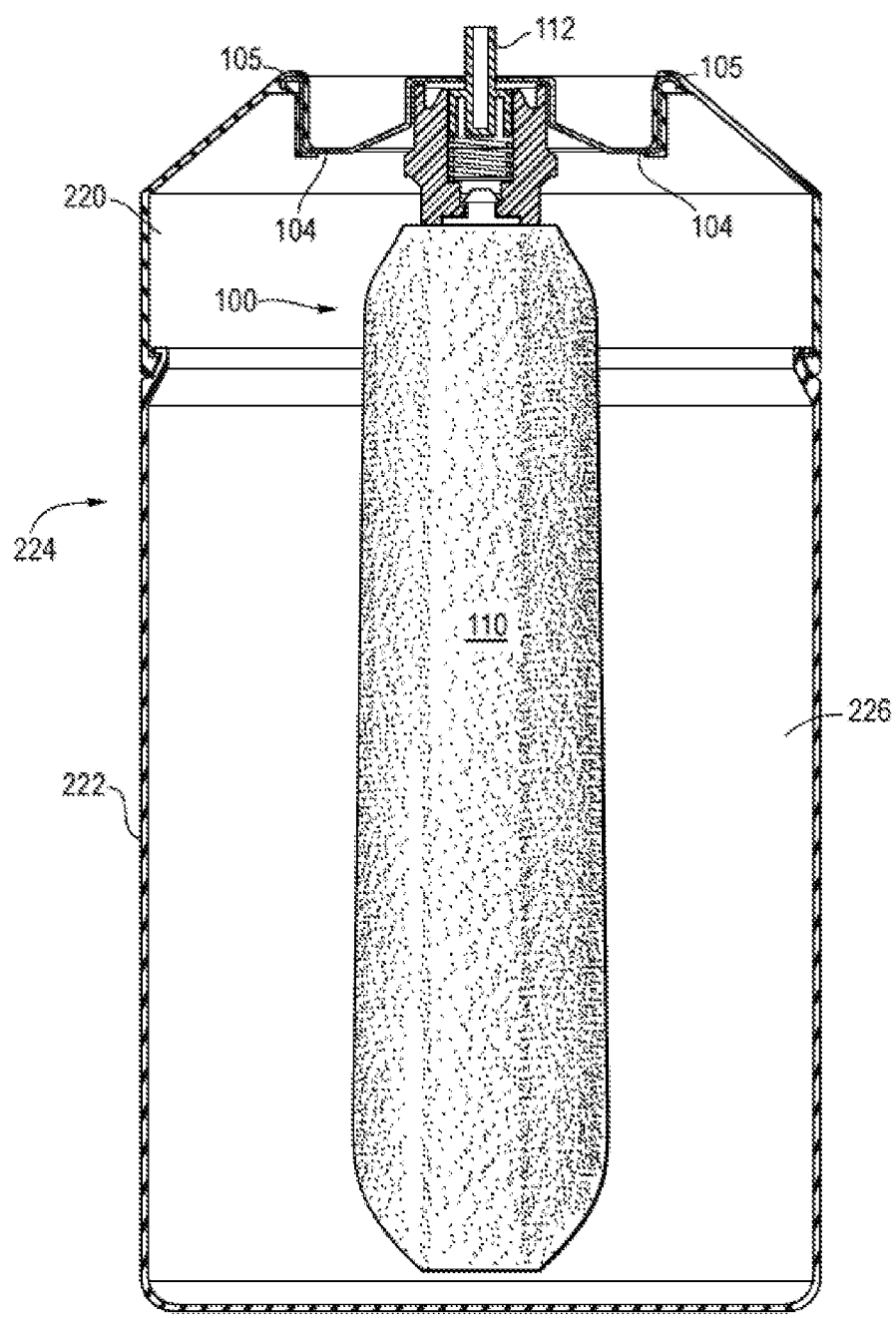
FIG. 14 is a sectional view of an injection-molded container with SBoV, in accordance with an embodiment of the present disclosure.
Figure 15:
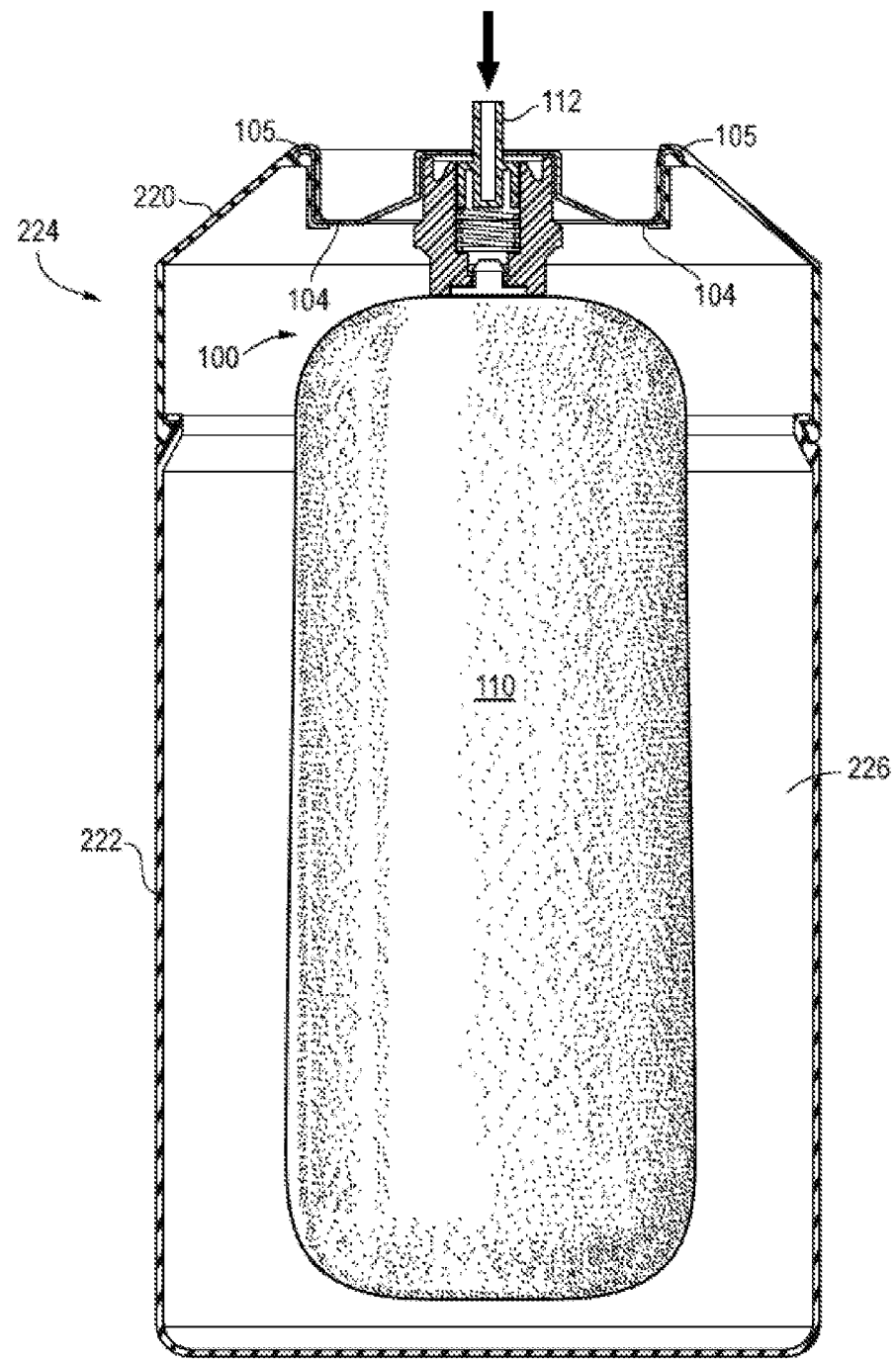
FIG. 15 is a sectional view an injection-molded container with a filled sleeve bag on valve assembly in accordance with an embodiment of the present disclosure.

FIG. 14 shows the bag 108 and sleeve 110 of the SBoV 100 extending freely into the interior chamber 226. The SBoV in FIG. 14 is empty and can be filled through valve 112 (arrow in FIG. 15). FIG. 15 shows container 224 having sleeve 110 stretched with the bag 108 holding a fluid composition and sleeve 110 applying the pressure.

The present container 224 (FIG. 14) maintains its shape, not collapsing or changing dimensions or appearance as the fluid composition is expelled from the bag (creating internal vacuum). In an embodiment, the average wall thickness, TT, for the container 224 is from average wall thickness is 0.075 mm, or 0.1 mm, or 0.15 mm, or 0.2 mm to 1.0 mm, or 1.5 mm, or 2 mm, or 3 mm.

The SBoV 100 can be filled with a fluid composition as previously disclosed herein. FIG. 15 shows filled SBoV 100 in the interior chamber of container 224.

Figure 16:
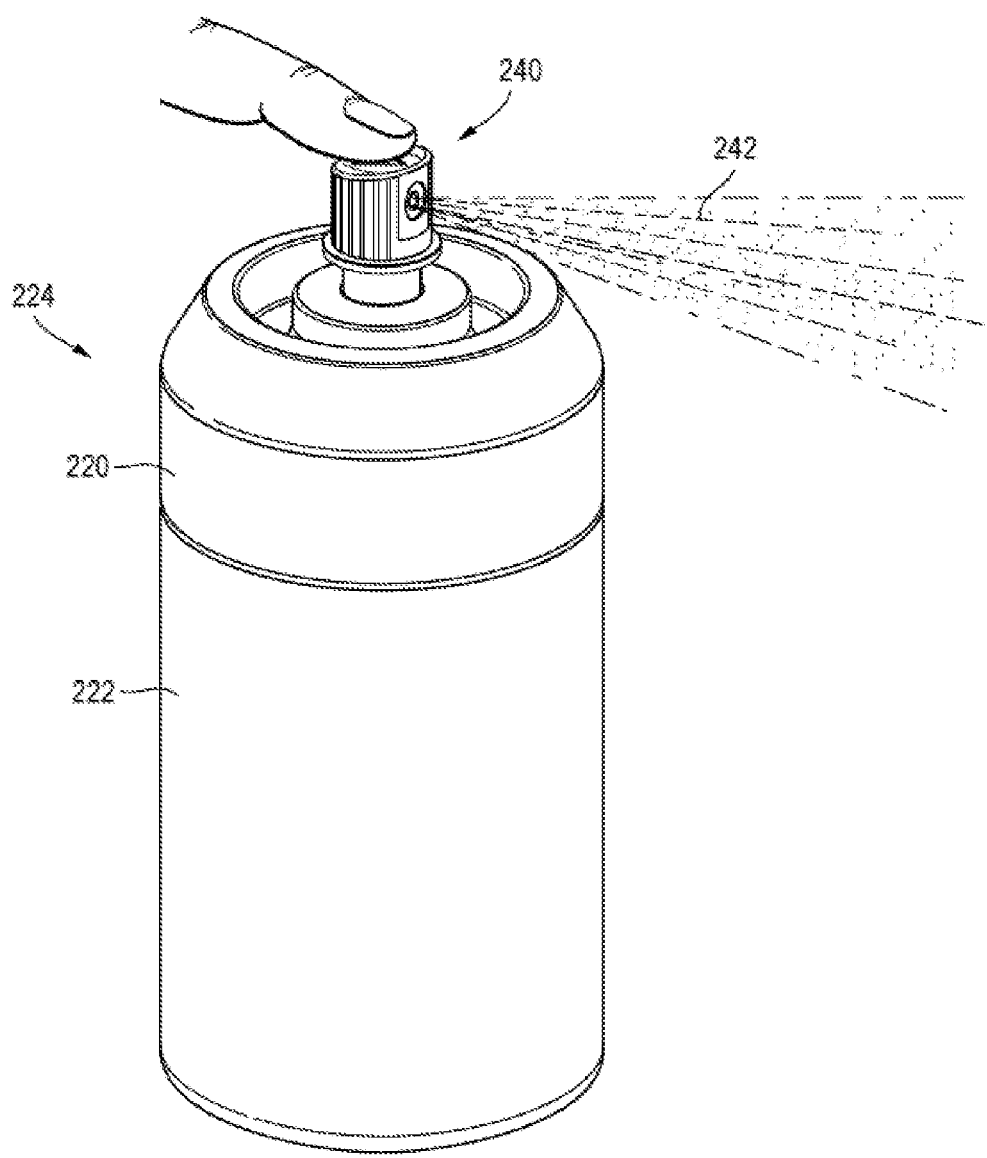
FIG. 16 is a perspective view of an injection-molded container with the SBoV disposed therein, the container dispensing a fluid composition.

In an embodiment, a valve cap 240 is attached to the valve 112 as shown in FIG. 16. Valve cap 240 enables a user of the container 224 to direct the spray (and/or direct flow pattern and/or direct flow rate) of the fluid composition 242 in a desired direction.

The injection mold apparatus can be modified to produce injection-molded container part with melt bonded SBoV and having various shapes and sizes. For example, the two opposing molds can be modified to produce container part (with melt bonded SBoV) having shorter or longer lengths, as desired.

In an embodiment, container 300 includes injection-molded container shoulder 302 as shown in FIG. 17. The SBoV 100 is melt bonded to the container shoulder 302 as previously disclosed. A body part 304 is attached (as previously disclosed) to the container shoulder 302 to form container 300 and define and interior and closed chamber therein.

In an embodiment container 400 includes injection-molded container half 402 as shown in FIG. 18. The SBoV 100 is melt bonded to the container half 402 as previously disclosed. A body part 404 is attached to the container shoulder 402 to form container 400 and define an interior chamber therein.

In an embodiment, container 500 includes injection-molded container body 502 as shown in FIG. 19. The SBoV 100 is melt bonded to the container body 502 as previously disclosed. A molded bottom portion lid to enclose container 500 can be attached to the open end of the container body 502 as desired. Alternatively, the bottom of container body 502 can remain open.

The presence of the valve 112 extending from each of container 300, 400 and 500 indicates that SBoV 100 (i) is disposed in the interior chamber of each container and (ii) the valve seat 104 and/or the lip portion 105 is melt bonded to the proximate end of each respective container part 302, 402, and 502.

Applicant discovered the ability to plastic mold a support container for SBoV provides the ability to produce specimens with tailored configurations heretofore not available.

Definitions and Test Methods

The numerical ranges disclosed herein include all values from, and including, the lower value and the upper value. For ranges containing explicit values (e.g., 1, or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight, and all test methods are current as of the filing date of this disclosure.

The term "composition," as used herein, refers to a mixture of materials which comprise the composition, as cup as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The term "creep" or "creep rate" is a relaxation characteristic of an elastomeric material. As used herein, "creep" represents the time dependent change in strain while maintaining a constant stress.

Density is measured in accordance with ASTM D 792.

The phrase "elastomeric composite" encompasses also elastomeric nanocomposites, nanocomposites, and nanocomposite compositions. The term "nanofiller" is used in the art collectively to describe nanoparticles useful for making nanocomposites. Such particles can comprise layers or platelet particles (platelets) obtained from particles comprising layers and can be in a stacked, intercalated, or exfoliated state. In some cases, the nanofillers comprise particles of a clay material known in the art as nanoclays (or NCs).

Elongation is determined in accordance with ASTM D 412. Elongation is the extension of a uniform section of a specimen (i.e., an elastomeric composite) expressed as percent of the original length as follows:

$$\text{Elongation \%} = \frac{\text{Final length} - \text{Original length}}{\text{Original length}} \times 100$$

An "ethylene-based polymer," as used herein is a polymer that contains more than 50 mole percent polymerized ethylene monomer (based on the total amount of polymerizable monomers) and, optionally, may contain at least one comonomer.

The term "flowable polymeric material" is a polymeric material heated above its melting point (for crystalline and semi-crystalline polymers) or above its glass transition point (for amorphous polymers) such that the polymeric material can be extruded and molded.

The term "heat seal initiation temperature," is minimum sealing temperature required to form a seal of significant strength, in this case, 2 lb/in (8.8N/25.4 mm). The seal is performed in a Topwave HT tester with 0.5 seconds dcup time at 2.7 bar (40 psi) seal bar pressure. The sealed specimen is tested in an lnstron Tensioner at 10 in/min (4.2 mm/sec or 250 mm/min).

Melt flow rate (MFR) is measured in accordance with ASTM D 1238, Condition 280° C./2.16 kg (g/10 minutes).

Melt index (MI) is measured in accordance with ASTM D 1238, Condition 190° C./2.16 kg (g/10 minutes).

An "olefin-based polymer," as used herein is a polymer that contains more than 50 mole percent polymerized olefin monomer (based on total amount of polymerizable monomers), and optionally, may contain at least one comonomer. Nonlimiting examples of olefin-based polymer include ethylene-based polymer and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 mole percent polymerized propylene monomer (based on the total amount of polymerizable monomers) and, optionally, may contain at least one comonomer.

As used herein, the term "stress relaxation", which is also used herein simply as "relaxation", describes time dependent change in stress while maintaining a constant strain. Stress of strained elastomeric material decreases with time due to molecular relaxation processes that take place within the elastomer.

Tensile strength and modulus, "Tensile strength" is a measure of the stiffness of an elastic material, defined as the linear slope of a stress-versus-strain curve in uniaxial tension at low strains in which Hooke's Law is valid. The value represents the maximum tensile stress, in MPa, applied during stretching of an elastomeric composite before its rupture. "Modulus" is a tensile stress of an elastomeric material at a given elongation, namely, the stress required to stretch a uniform section of an elastomeric material to a given elongation. This value represents the functional strength of the composite. M100 is the tensile stress at 100% elongation, M200 is the tensile stress at 200% elongation, etc. Tensile strength and modulus are measured in accordance with ASTM D 412.

Tm or "melting point" as used herein (also referred to as a melting peak in reference to the shape of the plotted DSC curve) is typically measured by the DSC (Differential Scanning calorimetry) technique for measuring the melting points or peaks of polyolefins as described in U.S. Pat. No. 5,783,638. It should be noted that many blends comprising two or more polyolefins will have more than one melting point or peak, many individual polyolefins will comprise only one melting point or peak.

It is specifically intended that the present disclosure not be limited to the embodiments and illustrations contained herein, but include modified forms of those embodiments including portions of the embodiments and combinations of elements of different embodiments as come with the scope of the following claims.

The invention claimed is:

1. A container comprising:
    a neck portion, a body portion, and a bottom portion defining an interior chamber, the container composed of a polymeric material;
    a sleeve bag on valve assembly (SBoV) comprising (i) a valve seat comprising a lip portion, (ii) a bag, and (iii) an elastic sleeve disposed around the bag, the elastic sleeve providing a pressure on the bag, a portion of the SBoV located in the container interior;
    the lip portion of the valve seat is melt bonded to the neck portion; wherein a melt bond comprising the polymeric material extends (i) around opposing sides of the lip portion and (ii) around opposing sides of the valve seat.

2. The container of claim 1 wherein the neck portion, the body portion, and the bottom portion are an integral component formed from the polymeric material.

3. The container of claim 1, wherein the bag is located in the interior chamber.

4. The container of claim 3 wherein the SBoV is filled with a fluid composition.

5. A container comprising:
    a container part composed of a polymeric material, the container part having a proximate end and a distal end;
    a sleeve bag on valve assembly (SBoV) comprising (i) a valve seat comprising a lip portion, the lip portion is melt bonded to the proximate end of the container part, (ii) a bag, and (iii) an elastic sleeve disposed around the bag, the elastic sleeve providing a pressure on the bag;
    the distal end of the container part having an exposed edge and a closure member at the distal end;
    a body portion having a reciprocal closure member at a reciprocal exposed edge; and
    the closure member and the reciprocal closure member are matingly engaged along the exposed edges to attach the container part to the body portion to form a closed container; and
    a melt bond comprising the polymeric material extends (i) around opposing sides of the lip portion and (ii) around opposing sides of the valve seat.

6. The container of claim 5 wherein the container defines an interior chamber and a portion of the SBoV extends into the interior chamber.

7. The container of claim 5 wherein the body portion is composed of a material that is different than the polymeric material of the container part.

8. The container of claim 2, wherein the polymeric material is selected from the group consisting of propylene-based polymer, ethylene-based polymer, and combinations thereof.

9. The container of claim 4 wherein the container maintains a shape as the fluid composition is expelled from the bag.

10. The container of claim 9 wherein the SBoV comprises a valve housing attached to the valve seat, the valve housing comprising a valve; and
    the SBoV can be refilled with a second fluid composition through the valve.

11. The container of claim 5 wherein the polymeric material is selected from the group consisting of propylene-based polymer, ethylene-based polymer, and combinations thereof.

12. The container of claim 6 wherein a portion of the bag is located in the interior chamber.

13. The container of claim 12 wherein the SBoV is filled with a fluid composition.

14. The container of claim 13 wherein the container maintains a shape as the fluid composition is expelled from the bag.

15. The container of claim 14 wherein the SBoV comprises a valve housing attached to the valve seat, the valve housing comprising a valve; and
    the SBoV can be refilled with a second fluid composition through the valve.

16. The container of claim 1, wherein the container is propellant-free.

* * * * *